United States Patent
Kawachi

(10) Patent No.: US 6,643,088 B1
(45) Date of Patent: Nov. 4, 2003

(54) MAGNETIC DISK DRIVE AND METHOD OF CONTROLLING A MOVEMENT OF CARRIAGE IN AN UNLOAD OPERATION OF HEAD

(75) Inventor: Hidetoshi Kawachi, Nishitama-gun (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/522,392

(22) Filed: Mar. 10, 2000

(30) Foreign Application Priority Data

Aug. 10, 1999 (JP) .......................................... 11-226498

(51) Int. Cl.⁷ .............................................. G11B 21/02
(52) U.S. Cl. ..................................................... 360/75
(58) Field of Search .............................. 360/75, 78.04, 360/78.06, 78.07; 318/459, 461, 563

(56) References Cited

U.S. PATENT DOCUMENTS

| | | | | |
|---|---|---|---|---|
| 4,237,501 A | * | 12/1980 | Barmache et al. ............. | 360/75 |
| 6,025,968 A | * | 2/2000 | Albrecht ...................... | 360/75 |
| 6,064,539 A | * | 5/2000 | Null et al. .................... | 360/75 |
| 6,229,663 B1 | * | 5/2001 | Yoneda et al. ................ | 360/75 |
| 6,373,650 B1 | * | 4/2002 | Pedrazzini ................... | 360/75 |
| 6,490,116 B1 | * | 12/2002 | Watanabe et al. ............. | 360/75 |

FOREIGN PATENT DOCUMENTS

JP            5-205424            8/1993

* cited by examiner

Primary Examiner—David Hudspeth
Assistant Examiner—Fred F. Tzeng
(74) Attorney, Agent, or Firm—Gray Cary Ware & Freidenrich LLP

(57) ABSTRACT

In a magnetic disk drive, in the case of unloading a head, a carriage receives a driving force of a voice coil motor as a controlled object so as to drive the head, and then, a speed $\omega$ of the carriage is detected from a back electromotive voltage generated in a coil of the voice coil motor. A ramp collision discriminator makes a decision that the head collides with the ramp on the basis of at least one of the speed $\omega$ and a controlled manipulated variable fed back to the voice coil motor as being a controlled object from a speed controller. In the case where a ramp collision is discriminated, a gain changeover switch is controlled so that a speed feedback gain of the speed controller is changed into a high gain side. Therefore, when the head collides with the ramp, it is possible to prevent a great reduction of the carriage moving speed and a temporary stop of a carriage moving operation, and thus, to realize a stable head unload operation.

12 Claims, 4 Drawing Sheets

MAGNETIC DISK DRIVE AND METHOD OF CONTROLLING A MOVEMENT OF CARRIAGE IN AN UNLOAD OPERATION OF HEAD

CROSS-REFERENCE TO RELATED APPLICATION

This application is based upon and claims the benefit of priority from the prior Japanese Patent Application No. 11-226498, filed Aug. 10, 1999, the entire contents of which are incorporated herein by reference.

BACKGROUND OF THE INVENTION

The present invention relates to a load/unload type magnetic disk drive which is constructed in a manner that when a rotation of a magnetic disk is stopped, a magnetic head is mounted on a ramp so as to be unloaded, and when the magnetic disk is rotated, the magnetic head is moved onto the magnetic disk so as to be loaded. In particular, the present invention relates to a magnetic disk drive which can preferably control a movement of carriage for carrying a magnetic head, and to a method of controlling a movement of carriage in an unload operation of a magnetic head.

Conventionally, in general, a contact start and stop method, what we call, a CSS method has been applied to an apparatus which records information in a magnetic disk by a magnetic head, and reproduces the information therefrom, for example, a small-size magnetic disk drive. The above CSS method has the following features.

First, in a CSS type disk drive, in a drive non-operation state, that is, in a state that a magnetic disk functioning as a recording media is not rotated, a magnetic head contacts with the disk. When the magnetic disk is started to rotate, the head receives an air bearing action by an air flow generated between the magnetic disk and the head, so that the head can be floated from the magnetic disk. In the disk drive having the structure as described above, in the initial stage of a rotation start of the magnetic disk and in the final stage of a rotation stop thereof, the head is slid on the magnetic disk in a state of contacting with the magnetic disk. For this reason, there is a possibility that a damage is given to a data area on the magnetic disk. In particular, in the case where an impact or the like is given to the drive from the outside, there is a high possibility that a damage is given to the magnetic disk.

For this reason, in the above CSS type magnetic disk drive, for the duration when the magnetic disk is in a rotation stop state, the head is positioned to a place different from a data zone on the magnetic disk, for example, a ring-like retracting zone for only head, which is secured on an inner peripheral side of the data zone, what we call, a CSS area. In the case where an electric power is supplied to the drive, or in the case where the host system gives an instruction to rotate a spindle motor (i.e., SPM) rotating the magnetic disk at a high speed, the spindle motor rises up by a steady-state speed in a state that the head is positioned to the above CSS area, and thereafter, the head is floated from the magnetic disk. The head is moved to the data zone on the magnetic disk for the first time after being floated. On the other hand, when the host system gives an instruction to stop the spindle motor in a state that the head is positioned to the data zone, the head is retracted to the CSS area, and thereafter, the spindle motor is stopped.

In the case where the head is retracted to the CSS area, by a driving force of a voice coil motor (i.e., VCM), a carriage functioning as a head moving mechanism, that is, an actuator collides with an inner peripheral stopper, and thereby, it is possible to prevent the head from going out of the CSS area.

In recent years, in the light of the concept of improving an impact resistance performance of disk drive and improving a recording density, in place of the aforesaid CSS technique, a head load/unload operation has been proposed such that the head and the magnetic disk have no contact with each other in the case where the magnetic disk is in a rotation stop state. In this load/unload operation, when a rotation of the magnetic disk is stopped, a tab, which is a distal end portion of suspension of the carriage, is slid along a ramp having an inclination provided outside the magnetic disk, and thereby, the head is lifted up from the magnetic disk, then, is retracted outside the disk so as to be unloaded, and thereafter the rotation of the magnetic disk is stopped. Moreover, when a rotation of the magnetic disk is started, that is, in a rotation start state, the rotation of the disk reaches a steady-state speed, and thereafter, the head is moved from the ramp onto the magnetic disk, and thus, is loaded.

In the above load/unload operation, a surface of the magnetic disk, that is, a flatness is improved, and a floating amount of the head is reduced, and thereby, it is possible to improve a recording density of the magnetic disk. In general, in the CSS action, the more the surface, that is, a flatness of the magnetic disk is improved, the head and the magnetic disk contact with each other when the spindle motor is stopped; as a result, the head and the magnetic disk contact with each other, and are mutually attracted. For this reason, there is a problem that it is difficult to apply the above CSS method to a magnetic disk having a high surface accuracy. In order to solve the above problem, it is indispensable to apply a head load/unload operation such that in an operation of the case where the spindle motor is stopped, the head is retracted to the ramp provided outside the magnetic disk so that the head and the magnetic disk becomes a non-contact state.

In such a head load/unload operation, during a head unload operation, the head must be moved at a low speed and at a constant speed so that the head does not contact with the magnetic disk. Usually, in a head load/unload control in the case where a power source is in an on-state, a back (counter) electromotive voltage generated in a voice coil motor is detected, and then, a detection signal is processed by a microprocessor (CPU), and thus, a moving rate or speed ω of the carriage is controlled to a low desired speed. Conventionally, there is a feedback control system having an unload speed control system block as shown in FIG. 1, as a control system for controlling a moving rate or speed ω of the carriage to a desired speed ωr.

As well known, in a feedback control system, a follow-up lag is generated. In the head unload operation, the follow-up lag is also generated, and there is a problem that the lag causes the following undesirable results.

First, so long as the head is moved on the magnetic disk to an outer circumferential direction (ramp direction), no external force such as a frictional force or the like acts onto the tab of the distal end of the suspension supporting the head; therefore, an external force acting onto the carriage is small. To the contrary, in a state that the head or the tab is moved on the ramp, a friction is generated between the tab and the ramp, and a load fluctuation (change) acts onto the carriage as a disturbance. In particular, in a head structure using a currently popular negative pressure head as the head, when the head is lifted out of the magnetic disk to the ramp, an external force is required for release a negative pressure generated between the head and the magnetic disk, and this is a load of hindering an unload operation.

As described above, in the above head load/unload type magnetic disk drive, in the head unload operation, when the head is separated from the magnetic disk, an external force of a direction hindering an unload operation rapidly acts onto the carriage. For this reason, there is the following problem in the speed feedback control system as shown in FIG. 1 applied to the conventional magnetic disk drive according to a speed feedback control which is carried out in the following manner that a back electromotive voltage generated in the voice coil motor is measured, and a moving rate or speed ω of the head or the carriage is detected, and thus, the moving rate or speed ω is approximated to a desired speed ωr. More specifically, in the above speed feedback control system, a follow-up lag is generated; as a result, a moving rate or speed of the head or the carriage lowers. Moreover, in the above speed feedback control system, in the worst case, when the head starts to be place onto the ramp, that is, when the head collides with the ramp, a phenomenon occurs such that a movement of the head, that is, the carriage is temporarily stopped.

Considering the above phenomenon in the unload operation from the point of view of head floating, the head is positioned on the magnetic disk in a state that a load applied to the head is eliminated. For this reason, in this state, namely, when the head ascends the ramp, a state that a movement of the head is temporarily stopped is continued for a relatively long period, for example, a period more than one rotation of the spindle motor so that due to a run out of the magnetic disk, negative and positive pressures produced between the head and the magnetic disk is unbalanced so that an unstable state takes place in a floating operation. In the aforesaid unstable state, the head and the magnetic disk contact with each other; for this reason, there is a problem that a damage is given to the magnetic disk.

BRIEF SUMMARY OF THE INVENTION

It is, therefore, an object of the present invention to provide a magnetic disk drive which can realize a stably head unload operation, and to provide a control method which can control a stable movement of carriage in an head unload operation.

More particularly, an object of the present invention is to provide a magnetic disk drive which can prevent a great reduction of a carriage moving speed in a ramp collision and a temporary stop of a carriage moving operation and can realize a stable head unload operation by making a detection that the head collides with a ramp when the head is unloaded, and changing a speed feedback gain into a larger value so as to improve a follow-up ability of a feedback control system when detecting a ramp collision, or by applying a feedforward driving force to a voice coil motor, and to provide a method of controlling a movement of the carriage in an head unload operation.

To achieve the above object, the present invention provides a head load/unload type magnetic disk drive including: speed detecting means for detecting a moving speed (VCM speed) of a carriage by observing a back electromotive voltage induced in a coil of a voice coil motor (VCM); and speed control means for controlling an unload speed by carrying out a feedback control on the basis of the carriage moving speed detected by the speed detecting means in a had unload operation of unloading the head to a ramp arranged outside a magnetic disk, wherein the magnetic disk drive is further provided with ramp collision discriminating means which discriminates a ramp collision when the head collides with the ramp on the basis of at least one of the speed detection result by the speed detecting means and a controlled manipulated variable fed back to a VCM side from the speed control means in the head unload operation, and a gain changeover means which changes a speed feedback gain by the speed control means into a high gain side in accordance with a ramp collision discrimination by the ramp collision discriminating means.

In the present invention, the following matter has attracted interest; more specifically, the carriage moving speed detected from the back electromotive voltage generated in the VCM or a controlled manipulated variable fed back to the VCM side from speed control means, reflects a ramp collision as shown in FIG. 5 or 6. The discrimination of the ramp collision is carried out by monitoring at least one of the above carriage moving speed and the controlled manipulated variable to the VCM, and then, in the case where the ramp collision is detected, the speed feedback gain is changed into a high gain side.

As described above, according to the present invention, the ramp collision is detected, and at this time, the speed feedback gain is changed into a high gain side so as to improve a follow-up ability of the speed feedback control system. By doing so, it is possible to prevent a great reduction of a carriage moving speed in a ramp collision and a generation of a temporary stop of the carriage moving operation, and to realize a stable head unload operation.

The above ramp collision discrimination may be made on the basis of either the above carriage moving speed (detected from the back electromotive voltage generated in the VCM) or the above controlled manipulated variable (fed back to the VCM side from the speed control means). Further, the ramp collision discrimination is made on the basis of the former and the latter, and thereby, it is possible to obtain a high accurate discrimination. In this case, the above ramp collision discriminating means may be composed of: first discriminating means which makes a first ramp collision discrimination on the basis of the carriage moving speed; second discriminating means which makes a second ramp collision discrimination on the basis of the controlled manipulated variable; and third discriminating means which finally makes a ramp collision on the basis of these two ramp collision discriminations. Preferably, either of the following discriminating logics may be applied to the above third discriminating means; more specifically, the discriminating logics include: a first discriminating logic of discriminating a ramp collision in the case where the above two ramp collision discriminating results both show a ramp collision; and a second discriminating logic of discriminating a ramp collision in the case where at least one discriminating result shows a ramp collision.

According to the above first discriminating logic, it is possible to prevent a disadvantage such that a ramp collision discrimination is made in error due to an influence such as a noise in the case where no ramp collision takes place, and thus, to carry out a ramp collision discrimination with a high accuracy. Moreover, according to the above second discriminating logic, it is possible to prevent a disadvantage such that no ramp collision discrimination is made in error regardless of the case where a ramp collision takes place, and thus, to carry out a ramp collision discrimination with a high accuracy. In addition, a decision which the first or second discriminating logic should be applied, may be made by making much of which the ramp collision is discriminated in error or the ramp collision is not discriminated in error.

In the case where a ramp collision is discriminated before a timer counts a predetermined time from the unload operation start, and the predetermined time elapses, by canceling the discrimination, it is possible to prevent a disadvantage such that a ramp collision discrimination is made in error regardless of the case where no ramp collision takes place.

In addition, the above ramp collision discrimination may be made on the basis of a magnitude of an external force acting on the carriage or a change of the external force. The external force acting on the carriage can be calculated on the basis of the above carriage moving speed and the above controlled manipulated variable.

In place of the above gain changeover means, feedforward compensating means may be provided so as to add a predetermined feedforward manipulated variable to the controlled manipulated variable fed back to the VCM side in accordance with the ramp collision discrimination by the ramp collision discriminating means.

As described above, when a ramp collision is detected, the predetermined feedforward manipulated variable added to the controlled manipulated variable from the speed control means is given to the VCM side, and thereby, it is possible to prevent a great reduction of a carriage moving speed in a ramp collision and a temporary stop of a carriage moving operation, and to realize a stable head unload operation.

In a manufacturing stage of the magnetic disk drive, a feedforward manipulated variable peculiar to the disk drive is calculated, and information indicative of a driving force of the disk drive is previously stored in memory means. Then, when a ramp collision is detected, by reading out the information indicative of the feedforward manipulated variable stored in the memory means, it is possible to generate the corresponding feedforward manipulated variable and to give it to the VCM. In particular, an operation for re-calculating the feedforward manipulated variable is carried out in accordance with a using condition of the magnetic disk drive, for example, for each rise of the disk drive, and thereby, it is possible to acquire an optimal feedforward manipulated variable always suitable for the disk drive.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A magnetic disk drive according to one embodiment of the present invention will be described below with reference to the accompanying drawings.

Figure 2:
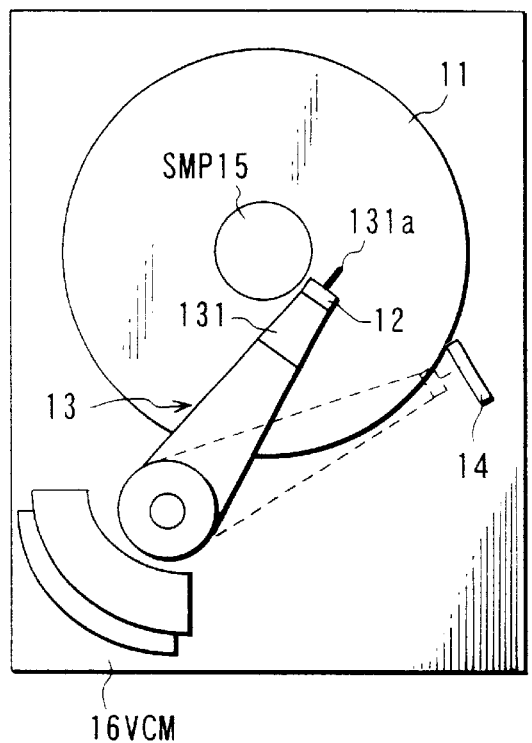
FIG. 2 is a plan view schematically showing a housing internal structure of a magnetic disk drive to which a head load/unload operation according to one embodiment of the present invention is applied.

FIG. 2 is a plan view schematically showing a structure of a magnetic disk drive to which a head load/unload operation according to one embodiment of the present invention is applied such that a head is loaded on a magnetic disk, and is unloaded outside the magnetic disk.

In FIG. 2, a reference numeral 11 denotes a magnetic disk as information recording medium in which data is recorded. Each recording surface of the magnetic disk 11 is formed with a great many of coaxial tracks (not shown). In each track, a servo area recording a servo data is arranged at equal intervals in order to seek and position a head. A space between the servo areas is determined as a user area, and in the user area, a plurality of data sectors as a recording unit are arranged. Further, these servo areas are radially arranged at equal intervals over each track from the center of the magnetic disk 11.

Although this embodiment describes a structure on the assumption that the magnetic disk drive in which a single magnetic disk 11 is arranged, it is apparent that a structure may be employed such that a plurality of magnetic disks 11 are arranged in the form of lamination via a gap.

A magnetic head 12 is located on each recording surface side of the magnetic disk 11 so as to correspond to each surface. The magnetic head 12 reads a data from the magnetic disk 11 in reproducing, and writes a data to the magnetic disk 11 in recording.

The head 12 is attached to a carriage 13 including a mechanism for moving the head as a rotary type actuator, and is moved to a radius direction of the magnetic disk 11 according to a rotation angle of the carriage 13. Whereby the head 12 is sought and positioned onto a desired track.

Figure 3:
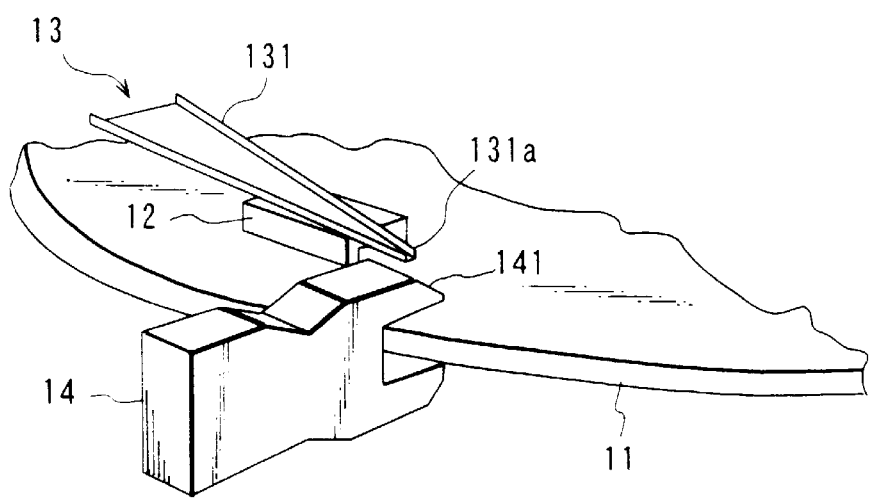
FIG. 3 is a perspective view schematically showing a part of magnetic disk in order to explain the head load/unload operation which is applied to the magnetic disk drive shown in FIG. 2.

A ramp, that is, a retraction section 14 for retracting the head 12 is arranged on an outer peripheral side of the magnetic disk 11 in a state that a rotation of a spindle motor (SPM) 15 is stopped so as to stop a rotation of the magnetic disk 11. As shown in FIG. 3, the ramp 14 is arranged outside the magnetic disk 11, and is located near the magnetic disk 11 and on a moving path of a tab 131a provided to a distal end of a suspension 131 which is attached to the carriage 13.

The magnetic disk 11 is rotated by the spindle motor (SPM) 15 at a high speed. The carriage 13 is driven by a voice coil motor (VCM) 16.

In the case where a rotation of the spindle motor (SPM) 15 is stopped, a head unload operation is carried out according to a control by a CPU 32. More specifically, according to a control by the CPU 32 shown in FIG. 4, when a current flows into a coil of the voice coil motor (VCM) 16, as shown by an arrow A of FIG. 2, the carriage 13 is moved to a radius direction of the magnetic disk 11, and then, the head 12 is retracted from the overhead of the magnetic disk 11 to the ramp 14. In this head unload operation, a collision of the head 12 with the ramp 14 is detected. The collision of the head 12 with the ramp 14 is detected from a moving rate or speed ω of the carriage 13 obtained based on a back electromotive voltage generated in the voice coil motor (VCM) 16, or the collision of the head 12 with the ramp 14 is detected from a moving rate or speed ω of the carriage 13 obtained based on a back electromotive voltage generated in the voice coil motor (VCM) 16 and a controlled manipulated variable given to the voice coil motor (VCM) 16 side. When the collision of the head 12 with the ramp 14 is detected, in response to the detection, instantaneously, a driving force for guiding the head 12 into the ramp 14 is temporarily increased, and then, the head 12 is securely guided into the ramp 14 without stopping the head 12. More specifically, in a feedback control system including the voice coil motor 16, the CPU 32 and the like, when the head 12 collides with the ramp 14, a speed feedback gain is changed over into a value larger than when the head 12 is moved toward the ramp 14, a follow-up ability increases in the feedback control system. Alternatively, in a system controlled by the feedback control system, a feedforward driving force is applied to the voice coil motor (VCM) 16, and then, the voice coil motor 16 is controlled as a feedforward system. As described above, when the head 12 collides with the ramp 14, a change is given to a control system controlling a movement of the head 12, and thereby, a moving rate or speed of the carriage 13 greatly lowers in a collision with the ramp, and thus, it is possible to prevent the carriage 13 from being temporarily stopped in a moving operation of the carriage 13.

In the aforesaid control system, a circuit for detecting a back electromotive voltage generated in the voice coil motor (VCM) 16 will be described below with reference to FIG. 4.

Figure 4:
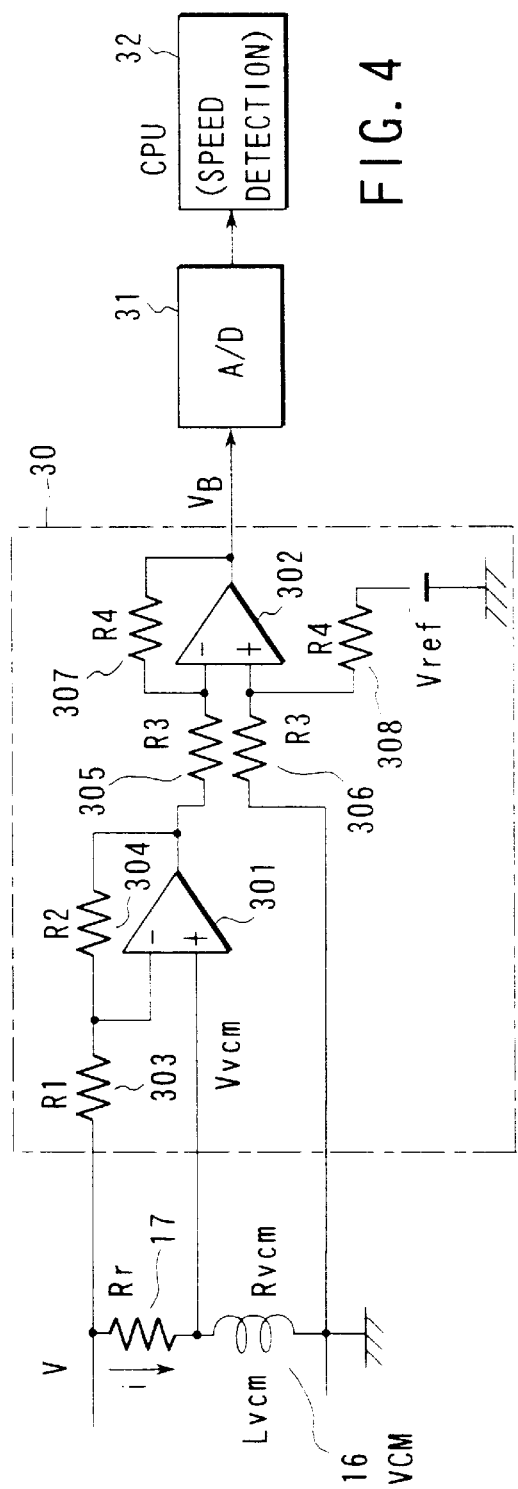
FIG. 4 is a block diagram showing a circuit construction of a back electromotive voltage detecting circuit 30 applied to the magnetic disk drive shown in FIG. 2.

As described above, in addition to a moving rate or speed ω, in order to make a detection that the tab 131a attached to the distal end of the suspension 131 supporting the head 12 collides with the ramp 14, a disk drive is provided with a back electromotive voltage detecting circuit 30 as shown in FIG. 4 for detecting a back electromotive voltage generated in the voice coil motor (VCM) 16.

The back electromotive voltage detecting circuit 30 is connected with one end of a coil of the voice coil motor (VCM) 16, a common connection point of the other end of the coil of the VCM 16 and one end of a sense resistor 17, and the other end of the sense resistor 17, and detects a back electromotive voltage (BEMF) induced in the coil of the voice coil motor (VCM) 16. Further, the back electromotive voltage detecting circuit 30 is composed of differential amplifiers 301 and 302, and resistors 303 to 308. Resistance values of resistors 303 and 304 are set to R1 and R2, respectively, resistance values of resistors 305 and 306 are both set to R3, and resistance values of resistors 307 and 308 are both set to R4.

In FIG. 4, assuming that V is set as a voltage of a common connection point of the sense resistor 17 and the resistor 303 included in the back electromotive voltage detecting circuit 30, the voltage V is expressed by the following equation (1).

$$V = i(Rr + Rvcm) + Lvcm \, di/dT + BEMF \tag{1}$$

where,

Rr: sense resistance

Rvcm: coil resistance of voice coil motor (VCM)

i: current flowing through voice coil motor (VCM)

Lvcm: coil inductance of voice coil motor (VCM)

BEMF: back electromotive voltage generated in voice coil motor (VCM)

In the case where a time change of the current i in a ramp collision is small, in the above equation (1), a term of coil inductance Lvcm of the voice coil motor (VCM) may be neglected because there is almost no influence. For this reason, the above term becomes as follows.

$$Lvcm \, di/dT \approx 0 \tag{2}$$

Therefore, the above equation (1) is expressed by the following equation (3).

$$V = i(Rr + Rvcm) + BEMF \tag{3}$$

From the above equation (3), a back electromotive voltage BEMF of the VCM 16 is obtained by the following equation (4).

$$BEMF = V - i(Rr + Rvcm) = V - iRr + iRvcm \tag{4}$$

In this case, assuming that Vvcm is set as a voltage of the coil end of the voice coil motor (VCM) 16, the following equation (5) is formed.

$$Vvcm = V - iRr \tag{5}$$

Therefore, the above equation (4) is expressed by the following equation (6).

$$BEMF = Vvcm - iRvcm \tag{6}$$

On the other hand, an output voltage VB of the back electromotive voltage detecting circuit 30 shown in FIG. 4 is expressed by the following equation (7).

$$VB = (R4/R3)\{i \times Rr(R2/R1) - Vvcm\} + Vref \tag{7}$$

where,

Vref: reference voltage

In this case, assuming that Rr, R2 and R1 values (constant) are set so as to become the following equation (8).

$$Rr(R2/R1) = Rvcm \tag{8}$$

By doing so, the above equation (7) is expressed by the following equation (9).

$$VB = (R4/R3)(i \times Rvcm - Vvcm) + Vref \tag{9}$$

Further, from the above equation (6), on the basis of a relationship of BEMF=Vvcm−iRvcm, the above equation (9) is expressed by the following equation (10).

$$VB = (R4/R3)(-BEMF) + Vref \tag{10}$$

As is apparent from the above equation (10), the output voltage VB of the back electromotive voltage detecting circuit 30 is a voltage proportional to the back electromotive voltage BEMF of the voice coil motor (VCM) 16 on the basis of the reference voltage, that is, Vref. Namely, the back electromotive voltage BEMF of the voice coil motor (VCM) 16 is detected by the back electromotive voltage detecting circuit 30.

The output voltage VB of the back electromotive voltage detecting circuit 30 is converted into a digital value by an A/D (analog/digital) converter 31, and then, sent to the CPU (microprocessor) 32 controlling the magnetic disk drive of FIG. 2. In this case, the A/D converter 31 may be built in the CPU 32.

The CPU 32 periodically reads the output voltage VB of the back electromotive voltage detecting circuit 30 sent via the A/D converter 31, and then, calculates a back electromotive voltage BEMF of the VCM 16 from the output voltage VB. A speed of the voice coil motor (VCM) 16, that is, a moving rate or speed ω of the carriage 13 is proportional to the back electromotive voltage BEMF. The CPU 32 multiplies the back electromotive voltage BEMF of the voice coil motor (VCM) 16 by a predetermined proportional coefficient, and thereby, calculates a carriage moving rate or speed ω. In this case, as described above, there is a predetermined relationship between the output voltage VB and the back electromotive voltage BEMF, and between the back electromotive voltage BEMF and the carriage moving rate or speed ω. Taking these relationships into consideration, an output stage of the back electromotive voltage detecting circuit 30 is constructed, and thereby, an output of the back electromotive voltage detecting circuit 30 can directly express the carriage moving rate or speed ω.

Next, one example of a block diagram of an unload speed control system constituting a feedback control system controlling a head moving speed will be described below with reference to FIG. 5.

Figure 5:
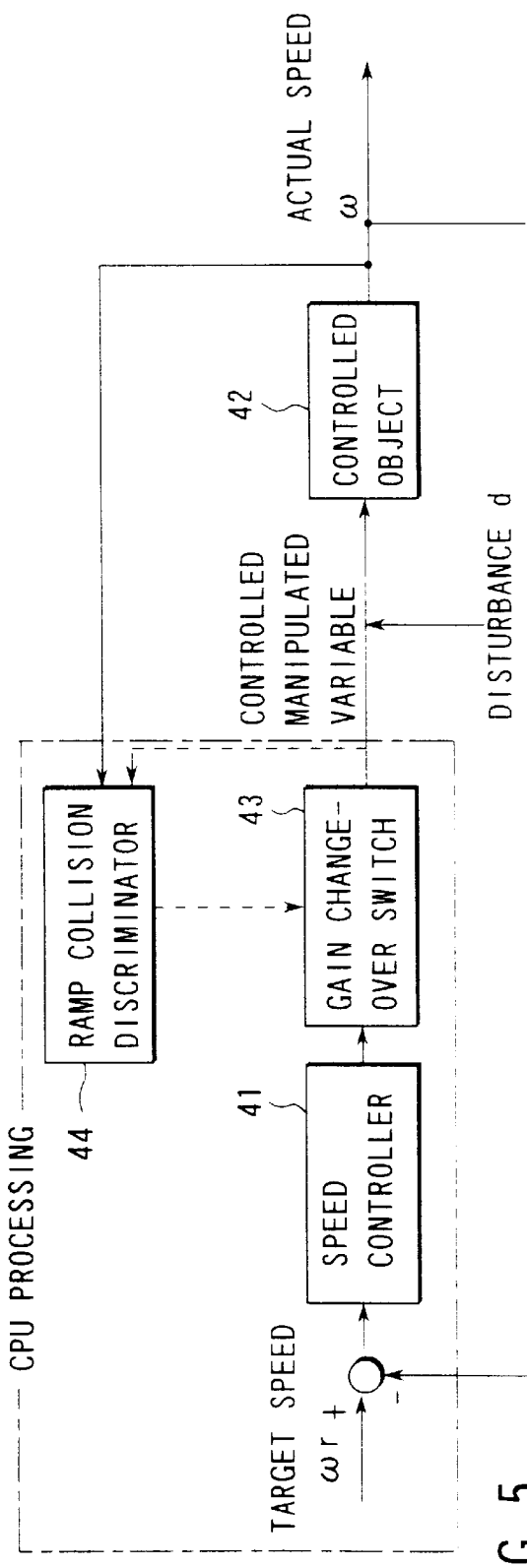
FIG. 5 is a block diagram showing a gain changeover type unload speed control system which is one example of a speed feedback control system applied to the magnetic disk drive shown in FIG. 2.

FIG. 5 shows a block diagram of a gain changeover type unload speed control system constituting a speed feedback control system applied to the magnetic disk drive shown in FIG. 2. The gain changeover type unload speed control system shown in FIG. 5 includes a gain changeover switch 43 for changing over a feedback gain, between a speed controller 41 and the voice coil motor (VCM) 16 shown in FIG. 2 and FIG. 4 as a controlled object 42. Further, the gain changeover type unload speed control system includes a ramp collision discriminator 44 which detects a collision of the head 12 with the ramp 14 by monitoring the carriage moving rate or speed ω, that is, a VCM speed ω.

In the embodiment shown in FIG. 5, the speed controller 41, the gain changeover switch 43 and the ramp collision discriminator 44 are a functional block which is realized by control program processing of the CPU 32. The functional block may be realized by constructing a circuit using hardware.

Next, an unload control will be described below with reference to FIGS. 6 to 8. In this case, the unload control means a feedback control in the case where the head 12 is retracted to the ramp 14 so as to be unloaded in the magnetic disk drive having the structure shown in FIG. 2.

Figure 6:
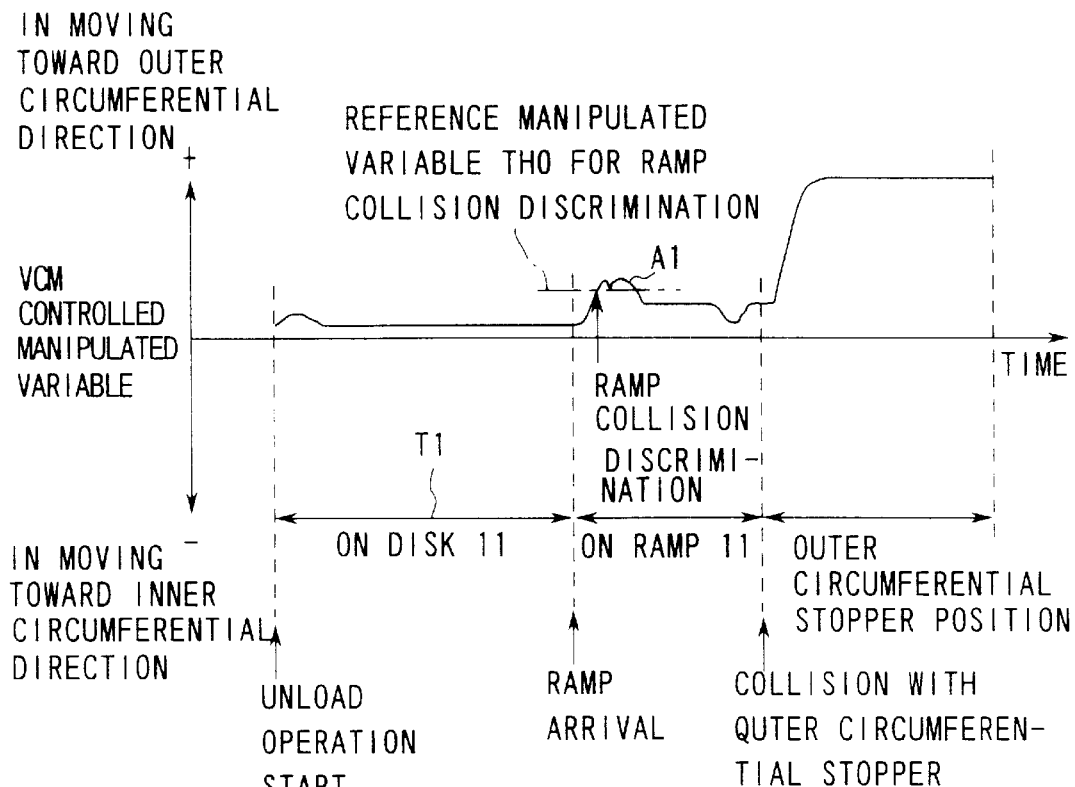
FIG. 6 is a graph showing a time variation of controlled manipulated variable of a voice coil motor (VCM) in the magnetic disk drive shown in FIG. 2.
Figure 7:
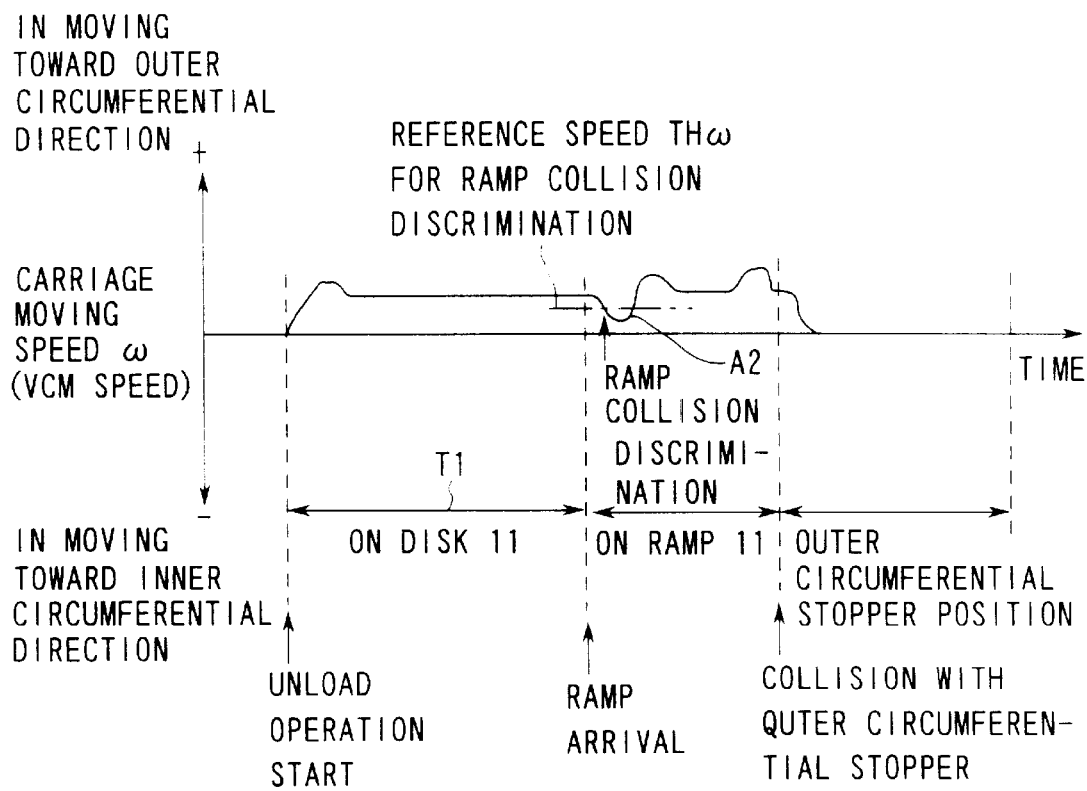
FIG. 7 is a graph showing a time variation of a carriage moving rate or speed (VCM rate or speed) in the magnetic disk drive shown in FIG. 2.
Figure 8:
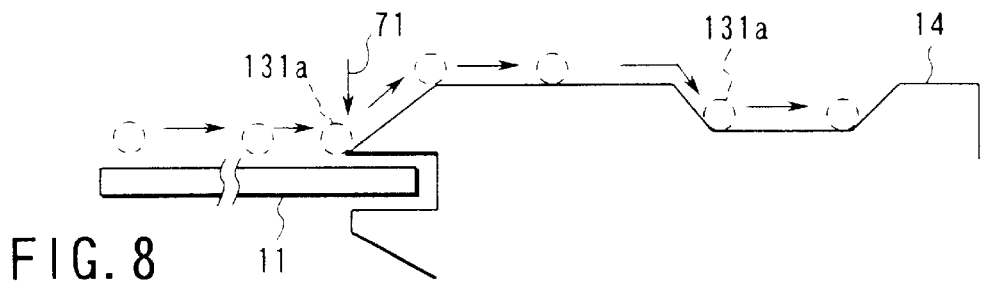
FIG. 8 is a view to conceptually explain a moving path of a tab in a head unload operation in the magnetic disk drive shown in FIG. 2.

FIG. 6 is a graph showing a time variation of controlled manipulated variable given to the voice coil motor (VCM) 16, FIG. 7 is a graph showing a time variation of a carriage moving rate or speed (that is, VCM speed), and FIG. 8 is a view showing a moving path of a tab 131a in a head unload operation. In this case, FIGS. 6 to 8 show an unload control operation in which the head 12 positioned on the magnetic disk 11 is moved toward an outer circumferential direction of the head 12, and then, is retracted onto the ramp 14. In this unload control operation, a back electromotive voltage generated in the coil of the voice coil motor (VCM) 16 is detected by the back electromotive voltage detecting circuit 30 shown in FIG. 4, and then, is periodically captured in the CPU 32 via the A/D converter 31. Then, on the basis of the input back electromotive voltage, the CPU 32 calculates a VCM speed as a driving speed of the voice coil motor (VCM) 16, that is, a moving rate or speed ω of the carriage 13 moving to a radius direction of the magnetic disk 11. Further, the CPU 32 carries out a feedback control so that the carriage moving rate or speed ω thus calculated becomes a desired speed ωr.

In order to clarify the unload control operation in this embodiment of the present invention, an unload control operation in the conventional control system shown in FIG. 1 will be briefly described below.

Figure 1:
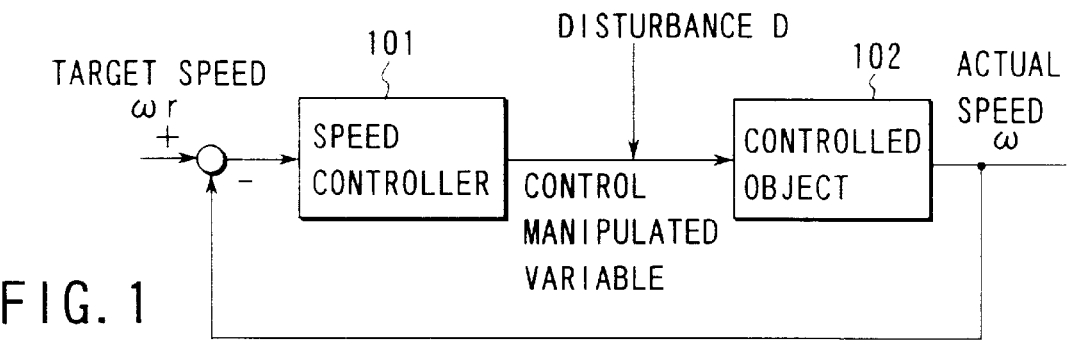
FIG. 1 is a block diagram showing an unload speed control system in a conventional magnetic disk drive.

In an unload speed control system by the conventional feedback control system shown in FIG. 1, a controller 101 corresponds to the speed controller 41 shown in FIG. 5 according to the embodiment of the present invention. Suppose that the controller 101 is a proportional integration (PI) controller, the controller 101 gives a controlled manipulated variable to a voice coil motor (CVM) which is a controlled object 102 corresponding to the controlled object 42 shown in FIG. 5, and the controlled manipulated variable has a time change as shown in FIG. 6. Moreover, a moving speed of the controlled object 102, that is, a carriage moving rate or speed (VCM speed) ω has a time change as shown in FIG. 7.

As is apparent from FIG. 7, in a period T1 when the head 12 is moved on the magnetic disk 11, a VCM controlled manipulated variable is approximately constant, and also, the carriage moving rate or speed (VCM speed) ω is approximately constant.

On the contrary, when the tab 131a attached to the distal end of the suspension 131 supporting the head 12 collides with the ramp 14 as shown by a reference numeral 71 in FIG. 8, an external force acts on the head 12; for this reason, as a portion A2 shown in FIG. 7, the carriage moving rate or speed (VCM speed) ω lowers, and thereby, the VCM controlled manipulated variable is increased as a portion A1 shown in FIG. 6. In such a state, in the case where an external force (load) is large, the carriage moving rate or speed (VCM speed) ω becomes zero, and a movement of the head 12, that is, the carriage 13 is temporarily stopped.

According to the embodiment of the present invention, in the gain changeover type unload speed control system constituting the feedback control system shown in FIG. 5, the ramp collision discriminator 44, which makes a decision that the head collides with the ramp, monitors an actual speed of the controlled object 42, that is, a moving rate or speed (VCM speed) ω of the carriage 13. Then, as shown in the portion A2 of FIG. 7, in the case where the moving rate or speed ω is less than a discriminating reference speed THω discriminating that the head collides with the ramp, the ramp collision discriminator 44 makes a decision that the tab 131a attached to the distal end of the suspension 131 supporting the head 12 collides with the ramp 14.

In the case where the ramp collision discriminator 44 discriminates a ramp collision, in accordance with the ramp collision discrimination, the gain changeover switch 43 is controlled so that a speed feedback gain is changed over from a LOW gain to a HIGH gain. By the aforesaid gain changeover, a response speed of the speed feedback control system becomes fast; therefore, it is possible to prevent the carriage moving rate or speed ω from lowering.

Moreover, the following method may be employed as a ramp collision discriminating method by the ramp collision discriminator 44. More specifically, in place of the carriage moving rate or speed (VCM speed) ω, a VCM controlled manipulated variable given to the controlled object 42 is monitored, and then, in the case where the VCM controlled manipulated variable exceeds a ramp collision discriminating reference manipulated variable $TH_0$, the ramp collision is discriminated.

Figure 9A:
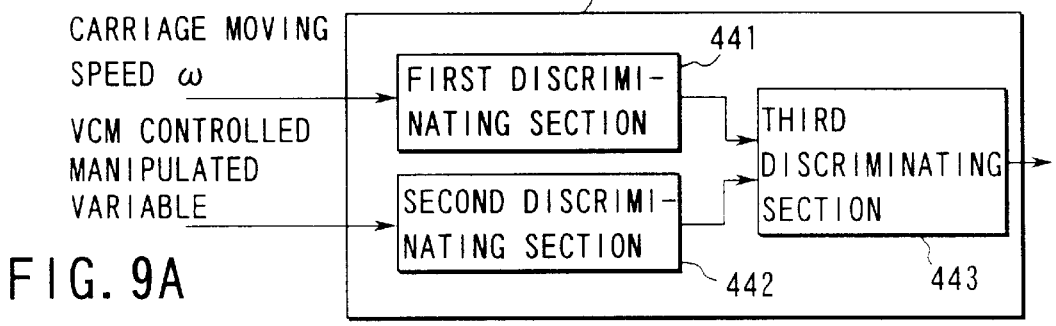
FIGS. 9A and 9B are block diagrams showing a modification example of a ramp collision discriminator in the magnetic disk drive shown in FIG. 2.

Moreover, as shown in FIG. 9A, the ramp collision discriminator 44 may be composed of: a first discriminating section 441 which monitors the moving rate or speed (VCM speed) ω of the carriage 13, and discriminates a ramp collision; a second discriminating section 442 which monitors the VCM controlled manipulated variable, and discriminates a ramp collision; and a third discriminating section 443 which finally discriminates the ramp collision on the basis of the ramp collision discriminating results by both discriminating sections 441 and 442.

In this case, the third discriminating section 443 is composed of a logic circuit, for example, a logic product circuit (AND circuit) or an OR circuit. Further, any of the following discriminating logics are applicable to the third discriminating section 443. More specifically, the discriminating logics includes: a first discriminating logic which discriminates a ramp collision in the case where the discriminating results by both discriminating sections 441 and 442 show a ramp collision; and a second discriminating logic which discriminates a ramp collision in the case where the discriminating result by at least one of the discriminating sections 441 and 442 shows a ramp collision.

The above first discriminating logic is suitable for the case of preventing the ramp collision from being discriminated in error when no ramp collision takes place, and discriminating the ramp collision with a high accuracy. On the other hand, the above second discriminating logic is suitable for the case of preventing the ramp collision from being not discriminated in error when a ramp collision takes place, and discriminating the ramp collision with a high accuracy. A decision which the first or second discriminating logic should be applied, is made by making much of which the ramp collision is discriminated in error or the ramp collision is not discriminated in error.

Moreover, by canceling a discrimination of ramp collision before a timer counting a reference time starts a time count from an unload control start and finishes counting the reference time, it is possible to improve a ramp collision discriminating accuracy.

Figure 9B:
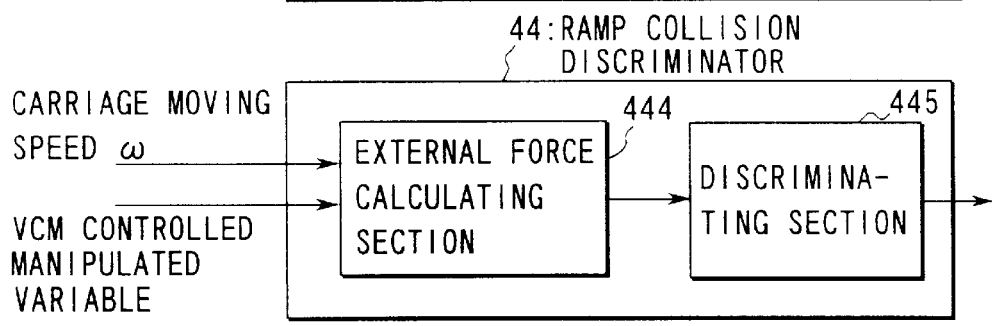

Further, as shown in FIG. 9B, the above ramp collision discriminator 44 may be composed of: an external force calculating section 444 which calculates an external force or disturbance applied to the controlled object 42 from the carriage moving rate or speed ω and the controlled manipulated variable; and a discriminating section 445 which discriminates a ramp collision in the case where the above calculated external force exceeds a reference value. In this case, an external force in the external force calculating section 444 may be calculated on the basis of the following calculating equation.

First, an external force is set as d, and a rotation angle used as a positional information of the carriage 13 is set as θ. In this case, a carriage moving rate or speed ω is expressed as dθ/dt, where, t is a time.

Next, assuming that a target speed is set as ωr, and a P controller (proportional controller) is presumed as the speed controller 41 for simplification, and further, a feedback gain is set as K, a controlled manipulated variable is expressed as K (ωr−ω).

Thus, an external force d is calculated from the following equation (11) assuming that an inertia of the carriage 13 is set as I.

$$d = I d\omega/dt - K(\omega r - \omega) \tag{11}$$

In the manner as described above, the external force calculating section 444 periodically calculates the external force d, and every each calculation, the discriminating section 445 compares the external force d with the aforesaid reference value, and thereby, it is possible to discriminate a ramp collision. In addition, in place of a magnitude of the external force d, it is possible to monitor a change of the external force, and to discriminate a ramp collision in the case where there is a change more than a reference value.

Figure 10:
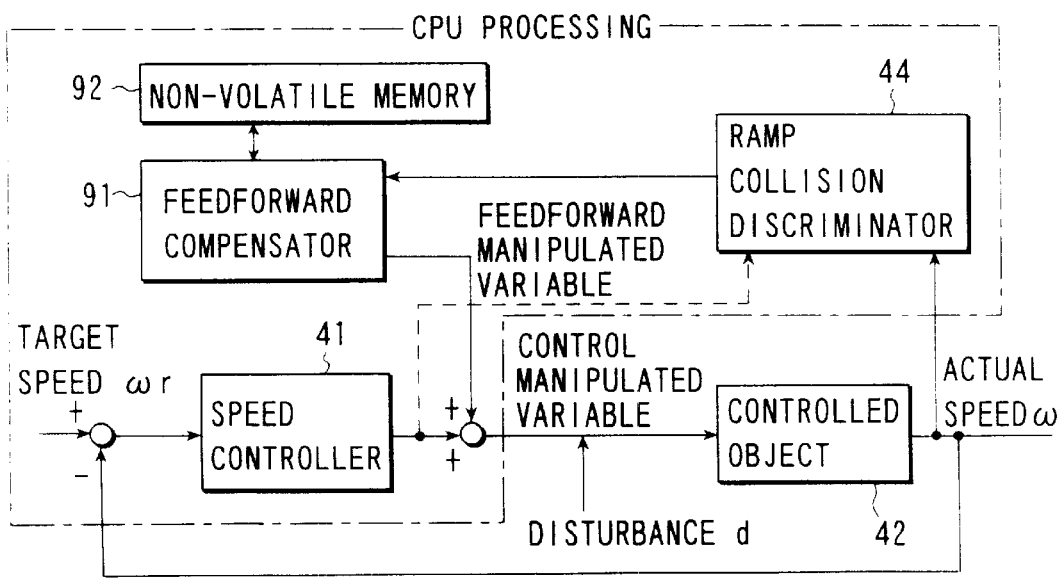
FIG. 10 is a block diagram showing a feedforward type unload speed control system which is another example of a speed feedback control system applied to the magnetic disk drive shown in FIG. 2.

The aforesaid embodiment has explained about the case where the gain changeover type unload speed control system is applied to the speed feedback control system. However, the present invention is not limited to the above case. For example, a feedforward type unload speed control system as shown in FIG. 10 may be employed. In a block diagram shown in FIG. 10, like reference numerals are used to designate the same part as FIG. 4, and the details are omitted. Therefore, in the following description, concerning part having no explanation, please refer to the embodiment already described.

The feedforward type unload speed control system as shown in FIG. 10 includes a feedforward compensator 91. In accordance with a ramp collision discrimination by the ramp collision discriminator 44, the feedforward compensator 91 adds a predetermined feedforward driving force as a compensated manipulated variable to a voice coil controlled manipulated variable which is a usual feedback control output from the speed controller 41.

As described above, in the case where a ramp collision is discriminate by the ramp collision discriminator 44 using the speed feedback control system composed of the feedforward type unload speed control system shown in FIG. 10, the feedforward compensator 91 adds a predetermined feedforward compensated manipulated variable to a voice coil controlled manipulated variable from the speed controller 41 so as to drive the voice coil motor (VCM) 16 as the controlled object 42, and thereby, it is possible to prevent a speed reduction occurring in a ramp collision.

In this embodiment, a value of the feedforward manipulated variable added by the feedforward compensator 91 is calculated in the following manner; more specifically, when manufacturing the magnetic disk drive shown in FIG. 2, a load in the unload operation, that is, an unload load is previously measured, and then, the above value is calculated from the load as a compensated manipulated variable meeting the load in the unload operation. As shown in FIG. 10, the above value, that is, the feedforward manipulated variable is previously stored in a non-volatile memory 92 such as a flash memory or the like. Whereby the feedforward compensator 91 reads a compensated manipulated variable from the non-volatile memory 92 when the ramp collision discriminator 44 discriminates a ramp collision, and thereby, can give a feedforward driving force to the controlled object 42.

In this case, as a calculating method of the feedforward compensated manipulated variable, an ideal speed curve (ramp load model) after ramp collision is prepared as a design value, and the value may be previously stored in the non-volatile memory 92 shown in FIG. 10. According to this calculating method, an external force in an unload operation is calculated on the basis of a speed curve and a manipulated variable by only feedforward compensation, and then, a reference to the above ramp load model is made, and further, a required feedforward compensated manipulated variable is calculated by the above calculated external force in the unload operation.

Moreover, in order to further improve an accuracy of feedforward manipulated variable (compensated manipulated variable), the unload operation is carried out by the calculated feedforward manipulated variable, and then, the model is modified on the basis of an error between the ramp load model and the feedforward manipulated variable. Subsequently, by repeating an operation of re-calculating the feedforward manipulated variable, that is, a learning operation of feedforward manipulated variable, it is possible to calculate an optimal feedforward manipulated variable.

This operation may be carried out for each rise of the magnetic disk drive. Moreover, the value of the feedforward manipulated variable may be stored in a specific area for only system of the magnetic disk 11 incapable of using from a user, or may be stored in the non-volatile memory 92.

As is evident from the above detailed description, according to the present invention, in the case of unloading the head, a ramp collision is discriminated on the basis of at least one of a carriage moving rate or speed detected from a back electromotive voltage generated in the voice coil motor and a controlled manipulated variable fed back to the voice coil motor, or on the basis of a magnitude or change of external force acting on the carriage. Moreover, in the case of detecting a ramp collision, a speed feedback gain is changed over into a large value so as to increase a follow-up ability, or a feedforward driving force is applied to the voice coil motor. Accordingly, it is possible to prevent a great reduction of carriage moving rate or speed and a temporal stop of carriage moving operation, and to realize a stable head unload operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk drive comprising:

a magnetically recordable magnetic disk;

a motor mechanism for rotating the magnetic disk;

a magnetic head for recording information in the magnetic disk, and reading the information therefrom;

a carriage for supporting the magnetic head, which is movable in a radius direction of the magnetic disk;

driving means for applying a driving force to the carriage so that the magnetic head is moved in said radius direction of the magnetic disk;

a ramp located outside the magnetic disk, and having a retract portion which positions the magnetic head outside the magnetic disk so as to prevent contact of the head with the disk while rotation of the disk is stopped;

contact detecting means for detecting contact of the head with the ramp; and control means for controlling the driving means, said control means controlling a head load operation of driving the carriage so that the magnetic head is guided from the retract portion of the ramp onto the magnetic disk, and a head unload operation of driving the carriage so that the head is moved from the overhead of the magnetic disk toward the ramp, and sliding the head along the ramp so that the head is guided to the retract portion of the ramp, and temporarily increasing a driving force given to the carriage in response to a detection of the contact in an unload operation, wherein the driving means includes a current source generating a driving current, and a voice coil motor having a voice coil generating a driving force in accordance with the driving current, and the contact detecting means includes a detecting circuit which detects a back electromotive voltage induced in the voice coil of the voice coil motor, and converts the detected back electromotive voltage into a speed signal corresponding to a moving speed of the carriage, and further, outputs the speed signal, wherein the control means generates a control signal having a controlled manipulated variable fed back to the voice coil motor, and the contact detecting means includes discriminating means which makes a decision that the head contacts with the ramp on the basis of the controlled manipulated variable fed back to the voice coil motor from the control means, wherein the control means includes gain changeover means which changes a feedback gain from a first gain into a second gain larger than the first gain in accordance with a ramp contact discrimination from the discriminating means.

2. A magnetic disk drive comprising:

a magnetically recordable magnetic disk;

a motor mechanism for rotating the magnetic disk;

a magnetic head for recording information in the magnetic disk, and reading the information therefrom;

a carriage for supporting the magnetic head, which is movable in a radius direction of the magnetic disk;

driving means for applying a driving force to the carriage so that the magnetic head is moved in said radius direction of the magnetic disk;

a ramp located outside the magnetic disk, and having a retract portion which positions the magnetic head outside the magnetic disk so as to prevent contact of the head with the disk while rotation of the disk is stopped;

contact detecting means for detecting a contact of the head with the ramp; and control means for controlling the driving means, said control means controlling a head load operation of driving the carriage so that the magnetic head is guided from the retract portion of the ramp onto the magnetic disk, and a head unload operation of driving the carriage so that the head is moved from the overhead of the magnetic disk toward the ramp, and sliding the head along the ramp so that the head is guided to the retract portion of the ramp, and temporarily increasing a driving force given to the carriage in response to a detection of the contact in an unload operation, wherein the driving means includes a current source generating a driving current, and a voice coil motor having a voice coil generating a driving force in accordance with the driving current, and the contact detecting means includes a detecting circuit which detects a back electromotive voltage induced in the voice coil of the voice coil motor, and converts the detected back electromotive voltage into a speed signal corresponding to a moving speed of the carriage, and further, outputs the speed signal, wherein the contact detecting means includes discriminating means which makes a decision that the head contacts with the ramp on the basis of one of a magnitude of an external force acting on the carriage and a change of the external force in the head unload operation, wherein the control means includes gain changeover means which changes a feedback gain from a first gain into a second gain larger than the first gain in accordance with a ramp contact discrimination from the discriminating means.

3. A magnetic disk drive comprising:

a magnetically recordable magnetic disk;

a motor mechanism for rotating the magnetic disk;

a magnetic head for recording information in the magnetic disk, and reading the information therefrom;

a carriage for supporting the magnetic head, which is movable in a radius direction of the magnetic disk;

driving means for applying a driving force to the carriage so that the magnetic head is moved in said radius direction of the magnetic disk;

a ramp located outside the magnetic disk, and having a retract portion which positions the magnetic head outside the magnetic disk so as to prevent contact of the head with the disk while rotation of the disk is stopped;

contact detecting means for detecting a contact of the head with the ramp; and control means for controlling the driving means, said control means controlling a head load operation of driving the carriage so that the magnetic head is guided from the retract portion of the ramp onto the magnetic disk, and a head unload operation of driving the carriage so that the head is moved from the overhead of the magnetic disk toward the ramp, and sliding the head along the ramp so that the head is guided to the retract portion of the ramp, and temporarily increasing a driving force given to the carriage in response to a detection of the contact in an unload operation, wherein the control means generates a first control signal having a first controlled manipulated variable fed back to the voice coil motor, the contact detecting means includes discriminating means which makes a decision that the head contacts with the ramp on the basis of the controlled manipulated variable fed back to the voice coil motor from the control means, and the control means further includes feedforward compensating means which generates a second control signal having a predetermined feedforward manipulated variable in accordance with the discrimination from the discriminating means, and adds the second control signal to the first control signal so as to generate a third control signal in which the second controlled manipulated variable is added to the first controlled manipulated variable, and feeds the third control signal back to the voice coil motor.

4. The magnetic disk drive according to claim 3, further comprising a memory means which stores information indicative of the feedforward manipulated variable peculiar to the drive in a manufacturing stage of the magnetic disk drive, wherein the feedforward compensating means adds the corresponding feedforward manipulated variable to the controlled manipulated variable on the basis of information indicative of the feedforward manipulated variable stored in the memory means.

5. A magnetic disk drive comprising:

a magnetically recordable magnetic disk;

a motor mechanism for rotating the magnetic disk;

a magnetic head for recording information in the magnetic disk, and reading the information therefrom;

a carriage for supporting the magnetic head, which is movable in a radius direction of the magnetic disk;

driving means for applying a driving force to the carriage so that the magnetic head is moved in said radius direction of the magnetic disk;

a ramp located outside the magnetic disk, and having a retract portion which positions the magnetic head outside the magnetic disk so as to prevent contact of the head with the disk while rotation of the disk is stopped;

contact detecting means for detecting a contact of the head with the ramp; and control means for controlling the driving means, said control means controlling a head load operation of driving the carriage so that the magnetic head is guided from the retract portion of the ramp onto the magnetic disk, and a head unload operation of driving the carriage so that the head is moved from the overhead of the magnetic disk toward the ramp, and sliding the head along the ramp so that the head is guided to the retract portion of the ramp, and temporarily increasing a driving force given to the carriage in response to a detection of the contact in an unload operation, wherein the control means generates a first control signal having a first controlled manipulated variable fed back to the voice coil motor, the contact detecting means includes discriminating means which makes a decision that the head contacts with the ramp on the basis of one of a magnitude of an external force acting on the carriage and a change of the external force in the head unload operation, and the control means includes feedforward compensating means which feeds a second control signal in which a predetermined feedforward manipulated variable is added to the first controlled manipulated variable, to the voice coil motor in accordance with the ramp contact discrimination from the discriminating means.

6. The magnetic disk drive according to claim 5, further comprising memory means which stores information indicative of the feedforward manipulated variable peculiar to the drive in a manufacturing stage of the magnetic disk drive, wherein the feedforward compensating means adds the corresponding feedforward manipulated variable to the controlled manipulated variable on the basis of information indicative of the feedforward manipulated variable stored in the memory means.

7. A magnetic disk drive comprising:

a magnetically recordable magnetic disk;

a motor mechanism for rotating the magnetic disk;

a magnetic head for recording information in the magnetic disk, and reading the information therefrom;

a carriage for supporting the magnetic head, which is movable in a radius direction of the magnetic disk;

driving means for applying a driving force to the carriage so that the magnetic head is moved in said radius direction of the magnetic disk;

a ramp located outside the magnetic disk, and having a retract portion which positions the magnetic head outside the magnetic disk so as to prevent contact of the head with the disk while rotation of the disk is stopped;

contact detecting means for detecting a contact of the head with the ramp; and control means for controlling the driving means, said control means controlling a head load operation of driving the carriage so that the magnetic head is guided from the retract portion of the ramp onto the magnetic disk, and a head unload operation of driving the carriage so that the head is moved from the overhead of the magnetic disk toward the ramp, and sliding the head along the ramp so that the head is guided to the retract portion of the ramp, and temporarily increasing a driving force given to the carriage in response to a detection of the contact in an unload operation, wherein the control means generates a control signal having a controlled manipulated variable fed back to the voice coil motor, and the discriminating means is composed of: first discriminating means which makes a decision that the head contacts with the ramp on the basis of the speed signal from the detecting circuit; second discriminating means which makes a decision that the head contacts with the ramp on the basis of the controlled manipulated variable from the control means; and third discriminating means which finally makes a decision that the head contacts with the ramp on the basis of the discriminating result from the first and second discriminating means.

8. A magnetic disk drive comprising;

a magnetically recordable magnetic disk;

a motor mechanism for rotating the magnetic disk;

a magnetic head for recording information in the magnetic disk, and reading the information therefrom;

a carriage for supporting the magnetic head, which is movable in a radius direction of the magnetic disk;

driving means for applying a driving force to the carriage so that the magnetic head is moved in said radius direction of the magnetic disk;

a ramp located outside the magnetic disk, and having a retract portion which positions the magnetic head outside the magnetic disk so as to prevent contact of the head with the disk while rotation of the disk is stopped;

contact detecting means for detecting a contact of the head with the ramp; and control means for controlling the driving means, said control means controlling a head load operation of driving the carriage so that the magnetic head is guided from the retract portion of the ramp onto the magnetic disk, and a head unload operation of driving the carriage so that the head is moved from the overhead of the magnetic disk toward the ramp, and sliding the head along the ramp so that the head is guided to the retract portion of the ramp, and temporarily increasing a driving force given to the carriage in response to a detection of the contact in an unload operation, wherein the control means generates a control signal having a controlled manipulated variable fed back to the voice coil motor, and the discriminating means includes external force calculating means which calculates an external force acting on the carriage on the basis of a speed detection signal from the detecting circuit and the controlled manipulated variable from the control means.

9. A magnetic head unload method of retracting a magnetic head supported by a carriage for moving the magnetic head in a radius direction of a magnetic disk and for writing information to the disk and reading the information therefrom, to a ramp having retract portion which arranges the magnetic head outside the magnetic disk from the overhead of a magnetically recordable magnetic disk so as to prevent contact of the head with the disk while rotation of the disk is stopped, comprising:

an unload operation start step of giving a driving force to the carriage so that the head is moved toward the ramp during rotation of the disk;

a contact detecting step of detecting contact of the head with the ramp; and a control step of controlling the driving force, the control step temporarily increasing a driving force given to the carriage in response to the contact detection, and sliding the head along the ramp so that the head is guided to the retract portion of the ramp, wherein the control step includes a step of generating a control signal having a controlled manipulated variable fed back to the voice coil motor, and the contact detecting step includes a discriminating step which makes a decision that the head contacts with the ramp on the basis of the controlled manipulated variable fed back to the voice coil motor in the control step, wherein the control step includes a gain changeover step of changing a feedback gain from a first gain into a second gain larger than the first gain in accordance with a ramp contact discrimination in the discriminating step.

10. A magnetic head unload method of retracting a magnetic head supported by a carriage for moving the magnetic head in a radius direction of a magnetic disk and for writing information to the disk and reading the information therefrom, to a ramp having retract portion which arranges the magnetic head outside the magnetic disk from the overhead of a magnetically recordable magnetic disk so as to prevent contact of the head with the disk while rotation of the disk is stopped, comprising:

an unload operation start step of giving a driving force to the carriage so that the head is moved toward the ramp during rotation of the disk;

a contact detecting step of detecting contact of the head with the ramp; and a control step of controlling the driving force, the control step temporarily increasing a driving force given to the carriage in response to the contact detection, and sliding the head along the ramp so that the head is guided to the retract portion of the ramp, wherein the control means includes a gain changeover means which changes a feedback gain from a first gain into a second gain larger than the first gain in accordance with a ramp contact discrimination in the discriminating step.

11. A magnetic head unload method of retracting a magnetic head supported by a carriage for moving the magnetic head in a radius direction of a magnetic disk and for writing information to the disk and reading the information therefrom, to a ramp having retract portion which arranges the magnetic head outside the magnetic disk from the overhead of a magnetically recordable magnetic disk so as to prevent contact of the head with the disk while rotation of the disk is stopped, comprising:

an unload operation start step of giving a driving force to the carriage so that the head is moved toward the ramp during rotation of the disk;

a contact detecting step of detecting contact of the head with the ramp; and a control step of controlling the driving force, the control step temporarily increasing a driving force given to the carriage in response to the contact detection, and sliding the head along the ramp so that the head is guided to the retract portion of the ramp, wherein the control step includes a step of generating a first control signal having a first controlled manipulated variable fed back to the voice coil motor, the contact detecting means includes a discriminating step which makes a decision that the head contacts with the ramp on the basis of the controlled manipulated variable fed back to the voice coil motor in the control step, and the control means further includes a feedforward compensating step which generates a second control signal having a predetermined feedforward manipulated variable in accordance with the discrimination in the discriminating step, and adds the second control signal to the first control signal so as to generate a third control signal in which the second controlled manipulated variable is added to the first controlled manipulated variable, and feeds the third control signal back to the voice coil motor.

12. A magnetic head unload method of retracting a magnetic head supported by a carriage for moving the magnetic head in a radius direction of a magnetic disk and for writing information to the disk and reading the information therefrom, to a ramp having retract portion which arranges the magnetic head outside the magnetic disk from the overhead of a magnetically recordable magnetic disk so as to prevent contact of the head with the disk while rotation of the disk is stopped, comprising:

an unload operation start step of giving a driving force to the carriage so that the head is moved toward the ramp during rotation of the disk;

a contact detecting step of detecting contact of the head with the ramp; and a control step of controlling the driving force, the control step temporarily increasing a driving force given to the carriage in response to the contact detection, and sliding the head along the ramp so that the head is guided to the retract portion of the ramp, wherein the control step includes a step of generating a first control signal having a first controlled manipulated variable fed back to the voice coil motor, the contact detecting step includes a discriminating step which makes a decision that the head contacts with the ramp on the basis of one of a magnitude of an external force acting on the carriage and a change of the external force in the head unload operation, and the control means includes a feedforward compensating step which feeds a second control signal in which a predetermined feedforward manipulated variable is added to the first controlled manipulated variable, back to the voice coil motor in accordance with a ramp contact discrimination in the discriminating step.

* * * * *